US012786519B2

(12) United States Patent
Zeng et al.

(10) Patent No.: US 12,786,519 B2
(45) Date of Patent: Nov. 3, 2026

(54) INTERACTION METHOD AND APPARATUS, ELECTRONIC DEVICE, AND STORAGE MEDIUM

(71) Applicant: Beijing Zitiao Network Technology Co., Ltd., Beijing (CN)

(72) Inventors: Zhizheng Zeng, Beijing (CN); Yuxi Tang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 19/111,699

(22) PCT Filed: Mar. 27, 2024

(86) PCT No.: PCT/CN2024/084151
§ 371 (c)(1),
(2) Date: Mar. 13, 2025

(87) PCT Pub. No.: WO2024/212810
PCT Pub. Date: Oct. 17, 2024

(65) Prior Publication Data

US 2026/0025555 A1 Jan. 22, 2026

(30) Foreign Application Priority Data

Apr. 12, 2023 (CN) ......................... 202310390147.5

(51) Int. Cl.
*H04N 21/4725* (2011.01)
*H04N 21/431* (2011.01)
*H04N 21/475* (2011.01)

(52) U.S. Cl.
CPC ..... *H04N 21/4725* (2013.01); *H04N 21/4312* (2013.01); *H04N 21/4755* (2013.01)

(58) Field of Classification Search
None
See application file for complete search history.

(56) References Cited

U.S. PATENT DOCUMENTS

2011/0197129 A1* 8/2011 Hsu ......................... G06F 16/70 715/716
2015/0189390 A1* 7/2015 Sirpal .............. H04N 21/42222 725/51

FOREIGN PATENT DOCUMENTS

CN 105989105 A 10/2016
CN 107092707 A 8/2017
(Continued)

OTHER PUBLICATIONS

International Search Report for International Application No. PCT/CN2024/084151, mailed on Jun. 26, 2024, 6 pages.
(Continued)

*Primary Examiner* — Junior O Mendoza
(74) *Attorney, Agent, or Firm* — Astute IP Law Group

(57) ABSTRACT

Embodiments of the present disclosure provide an interaction method and apparatus, an electronic device, and a storage medium. The method includes: receiving a first trigger operation, where the first trigger operation is associated with at least one piece of media content that is media content on which a current user has performed a first interactive operation; and adding the at least one piece of media content to a media content collection in response to the first trigger operation, where the media content collection is a collection of at least part of media content on which the current user has performed a second interactive operation.

16 Claims, 7 Drawing Sheets

(56) References Cited

FOREIGN PATENT DOCUMENTS

| | | | |
|---|---|---|---|
| CN | 113010243 | A | 6/2021 |
| CN | 113038198 | A | 6/2021 |
| CN | 113423019 | A | 9/2021 |
| CN | 115580749 | A | 1/2023 |
| CN | 115623274 | A | 1/2023 |
| CN | 115687662 | A | 2/2023 |
| CN | 115858961 | A | 3/2023 |
| CN | 116405737 | A | 7/2023 |
| WO | 2018153100 | A1 | 8/2018 |
| WO | 2023/035936 | A1 | 3/2023 |

OTHER PUBLICATIONS

Extended European Search Report received for European Application No. 24787916.6, mailed on Jul. 2, 2026, 11 pages.

Office Action received for Chinese Patent Application No. 202310390147.5, mailed on Jun. 13, 2026, 19 pages (10 pages of English Translation and 9 pages of Original Document).

Zhao, Meizhu, "Research on the Application of Information Interaction Design in Douyin Short-video", Changchun University of Technology, 2022, 5 (2 pages of English Translation and 3 pages of Original Document).

* cited by examiner

INTERACTION METHOD AND APPARATUS, ELECTRONIC DEVICE, AND STORAGE MEDIUM

CROSS-REFERENCE TO RELATED APPLICATION(S)

The present application is a national stage application filed under 35 U.S.C. 371 based on International Patent Application No. PCT/CN2024/084151, filed Mar. 27, 2024, which claims priority to Chinese Patent Application No. 202310390147.5, filed on Apr. 12, 2023 and entitled "INTERACTION METHOD AND APPARATUS, ELECTRONIC DEVICE, AND STORAGE MEDIUM", which are incorporated herein by reference in their entireties.

FIELD

Embodiments of the present disclosure relate to the field of computer technologies, and in particular, to an interaction method and apparatus, an electronic device, and a storage medium.

BACKGROUND

In the prior art, users can watch and favorite videos. However, ways to favorite videos are undiversified.

SUMMARY

Embodiments of the present disclosure provide an interaction method and apparatus, an electronic device, and a storage medium, to diversify a way to favorite media content.

According to a first aspect, an embodiment of the present disclosure provides an interaction method. The method includes:

- receiving a first trigger operation, and the first trigger operation is associated with at least one piece of media content that is media content on which a current user has performed a first interactive operation; and
- adding the at least one piece of media content to a media content collection in response to the first trigger operation, and the media content collection is a collection of at least part of media content on which the current user has performed a second interactive operation.

According to a second aspect, an embodiment of the present disclosure further provides an interaction apparatus. The apparatus includes:

- an operation receiving module configured to receive a first trigger operation, and the first trigger operation is associated with at least one piece of media content that is media content on which a current user has performed a first interactive operation; and
- a first adding module configured to add the at least one piece of media content to a media content collection in response to the first trigger operation, and the media content collection is a collection of at least part of media content on which the current user has performed a second interactive operation.

According to a third aspect, an embodiment of the present disclosure further provides an electronic device. The electronic device includes:

- one or more processors; and
- a memory configured to store one or more programs, where

- the one or more programs, when executed by the one or more processors, cause the one or more processors to perform the interaction method according to the embodiments of the present disclosure.

According to a fourth aspect, an embodiment of the present disclosure further provides a computer-readable storage medium having a computer program stored thereon. The program, when executed by a processor, causes the processor to perform the interaction method according to the embodiments of the present disclosure.

According to the interaction method and apparatus, the electronic device, and the storage medium provided in the embodiments of the present disclosure, the first trigger operation associated with the at least one piece of media content is received, and the at least one piece of media content is the media content on which the current user has performed the first interactive operation. The at least one piece of media content is added to the media content collection in response to the first trigger operation, and the media content collection is the collection of the at least part of media content on which the current user has performed the second interactive operation.

BRIEF DESCRIPTION OF THE DRAWINGS

The foregoing and other features, advantages, and aspects of embodiments of the present disclosure become more apparent with reference to the following specific implementations and in conjunction with the accompanying drawings. Throughout the drawings, the same or similar reference numerals denote the same or similar elements. It should be understood that the accompanying drawings are schematic and that parts and elements are not necessarily drawn to scale.

DETAILED DESCRIPTION OF EMBODIMENTS

Figure 1:
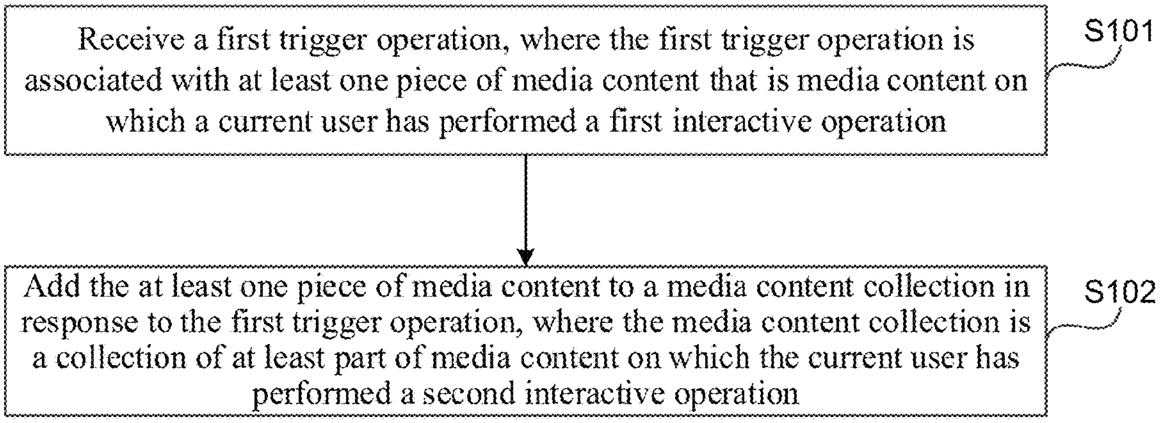
FIG. 1 is a schematic flowchart of an interaction method according to an embodiment of the present disclosure.

The embodiments of the present disclosure are described in more detail below with reference to the accompanying drawings. Although some embodiments of the present disclosure are shown in the accompanying drawings, it should be understood that the present disclosure may be implemented in various forms and should not be construed as being limited to the embodiments set forth herein. Rather, these embodiments are provided for a more thorough and complete understanding of the present disclosure. It should be understood that the accompanying drawings and the embodiments of the present disclosure are only for exemplary purposes, and are not intended to limit the scope of protection of the present disclosure.

It should be understood that the various steps described in the method implementations of the present disclosure may be performed in different orders, and/or performed in parallel. Furthermore, additional steps may be included and/or the execution of the illustrated steps may be omitted in the method implementations. The scope of the present disclosure is not limited in this respect.

The term “include/comprise” used herein and the variations thereof are an open-ended inclusion, namely, “include/comprise but not limited to”. The term “based on” is “at least partially based on”. The term “an embodiment” means “at least one embodiment”. The term “another embodiment” means “at least one another embodiment”. The term “some embodiments” means “at least some embodiments”. Related definitions of the other terms will be given in the description below.

It should be noted that concepts such as “first” and “second” mentioned in the present disclosure are only used to distinguish different apparatuses, modules, or units, and are not used to limit the sequence of functions performed by these apparatuses, modules, or units or interdependence.

It should be noted that the modifiers “one” and “a plurality of” mentioned in the present disclosure are illustrative and not restrictive, and those skilled in the art should understand that unless the context clearly indicates otherwise, the modifiers should be understood as “one or more”.

The names of messages or information exchanged between a plurality of apparatuses in the implementations of the present disclosure are used for illustrative purposes only, and are not used to limit the scope of these messages or information.

It can be understood that before the use of the technical solutions disclosed in the embodiments of the present disclosure, the user shall be informed of the type, range of use, use scenarios, etc. of personal information involved in the present disclosure in an appropriate manner in accordance with the relevant laws and regulations, and the authorization of the user shall be obtained.

For example, in response to reception of an active request from the user, prompt information is sent to the user to clearly inform the user that a requested operation will require access to and use of the personal information of the user. As such, the user can independently choose, based on the prompt information, whether to provide the personal information to software or hardware, such as an electronic device, an application, a server, or a storage medium, that performs operations in the technical solutions of the present disclosure.

As an optional but non-limiting implementation, in response to the reception of the active request from the user, the prompt information may be sent to the user in the form of, for example, a pop-up window, in which the prompt information may be presented in text. Furthermore, the pop-up window may further include a selection control for the user to choose whether to “agree” or “disagree” to provide the personal information to the electronic device.

It can be understood that the above process of notifying and obtaining the authorization of the user is only illustrative and does not constitute a limitation on the implementations of the present disclosure, and other manners that satisfy the relevant laws and regulations may also be applied in the implementations of the present disclosure.

FIG. 1 is a schematic flowchart of an interaction method according to an embodiment of the present disclosure. The method may be performed by an interaction apparatus. The apparatus may be implemented by software and/or hardware, and may be configured in an electronic device, typically in a mobile phone or a tablet computer. The interaction method provided in this embodiment of the present disclosure is applicable to a scenario of adding at least part of media content on which an interactive operation has been performed to a media content collection on which another interactive operation has been performed, and in particular, to a scenario of favoriting at least part of media content liked.

As shown in FIG. 1, the interaction method provided in this embodiment may include the following steps.

S101: Receive a first trigger operation, and the first trigger operation is associated with at least one piece of media content that is media content on which a current user has performed a first interactive operation.

The first trigger operation may be a trigger operation for indicating to add one or more pieces of media content on which the current user has performed the first interactive operation to a media content collection, such as an operation of triggering a corresponding control or an operation of performing a corresponding trigger gesture. The first interactive operation may be considered as an operation of interacting with the corresponding media content, including at least one of a comment operation, a share operation, a like operation, a favorite operation, and a virtual item sending operation. Optionally, the first interactive operation may be an interactive operation of interacting with the corresponding media content, such as the comment operation, the share operation, the like operation, or the virtual item sending operation. Accordingly, the at least one piece of media content may be media content corresponding to the first trigger operation, which is media content on which the current user has performed the first interactive operation, such as media content that the current user has made a comment on, shared, liked, or sent a virtual item for. The current user may be considered as a user currently performing the first trigger operation.

In this embodiment, the user may add the at least one piece of media content on which the user has performed the first interactive operation to the media content collection by performing the first trigger operation. For example, the user may perform, by performing the first trigger operation, a second interactive operation in bulk on the one or more pieces of media content on which the user has performed the first interactive operation, thereby adding the one or more pieces of media content to the media content collection. For example, one or more pieces of media content liked by the user are added to a favorites list, that is, turned into favorites.

Specifically, the current user may perform the first trigger operation. Accordingly, a current application may receive the first trigger operation performed by the current user.

S102: Add the at least one piece of media content to the media content collection in response to the first trigger operation, and the media content collection is a collection of at least part of media content on which the current user has performed the second interactive operation.

The media content collection may be the collection of the at least part of media content on which the current user has performed the second interactive operation. For example, the media content collection may include a collection of part of media content on which the current user has performed the second interactive operation, or may include a collection of all media content on which the current user has performed the second interactive operation.

The second interactive operation may be considered as an operation of interacting with the corresponding media content, including at least one of the comment operation, the share operation, the like operation, the favorite operation, and the virtual item sending operation. The second interactive operation is a different interactive operation performed on the media content than the first interactive operation. For example, when the first interactive operation is the comment operation, the share operation, the like operation, the virtual item sending operation, or another interactive operation, the second interactive operation may be the favorite operation. In this case, the media content collection may be a media content collection favorited by the current user, such as a favorites page or a favorites folder.

It should be noted that the second interactive operation may be a different trigger operation than the first trigger operation. In other words, a media content adding approach in which the user adds media content to the media content collection by performing the first trigger operation is different from a media content adding approach in which the user adds a specific piece of media content to the media content collection by performing the second interactive operation. For example, the second interactive operation may differ from the first trigger operation in at least one of a trigger approach and a response approach.

In this embodiment, the at least one piece of media content on which the current user has performed the first interactive operation may be added to the media content collection when the first trigger operation is received. For example, at least one of currently displayed media content, associated media content on which the current user has performed the first trigger operation and that is associated with the currently displayed media content, and media content that is selected by the current user and on which the first interactive operation has been performed is added to the media content collection.

It can be understood that after the at least one piece of media content on which the current user has performed the first interactive operation is added to the media content collection, the at least one piece of media content may be displayed in a state in which the second interactive operation has been performed. For example, a control that corresponds to the at least one piece of media content and that is used to perform the second interactive operation is displayed in the state in which the second interactive operation has been performed.

According to the interaction method provided in this embodiment, the first trigger operation associated with the at least one piece of media content is received, and the at least one piece of media content is the media content on which the current user has performed the first interactive operation. The at least one piece of media content is added to the media content collection in response to the first trigger operation, and the media content collection is the collection of the at least part of media content on which the current user has performed the second interactive operation. According to this embodiment, with the above technical solution, the user may perform the first trigger operation to add the at least one piece of media content on which the user has performed the first interactive operation to the media content collection on which the user has performed the second interactive operation. This can diversify a way to add media content to the media content collection on which the second interactive operation has been performed, thereby diversifying a way to perform the second interactive operation.

Figure 2:
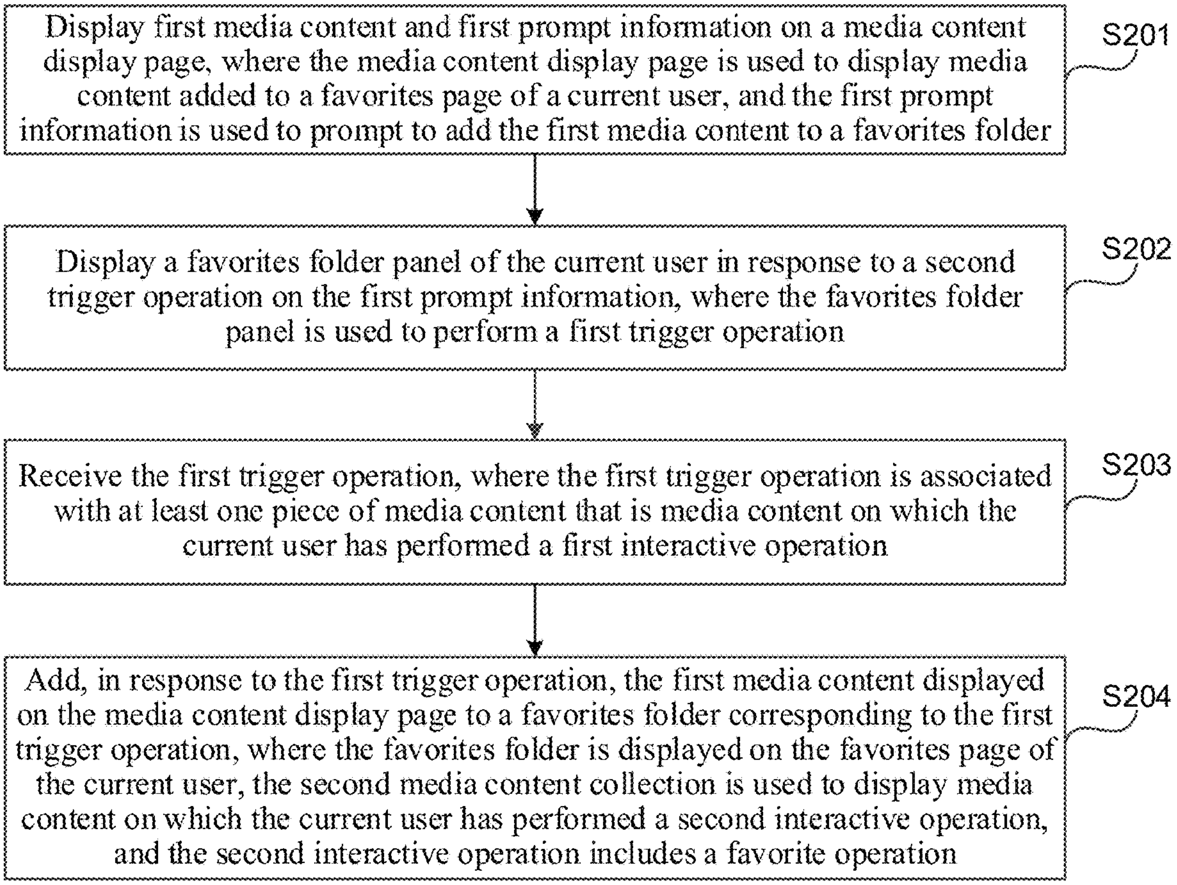
FIG. 2 is a schematic flowchart of another interaction method according to an embodiment of the present disclosure.

FIG. 2 is a schematic flowchart of another interaction method according to an embodiment of the present disclosure. The solution in this embodiment may be combined with one or more optional solutions in the above embodiment. Optionally, the second interactive operation includes the favorite operation, and the adding the at least one piece of media content to the media content collection includes: adding first media content displayed on a media content display page to a favorites folder corresponding to the first trigger operation, and the favorites folder is displayed on a favorites page of the current user, and the media content display page is used to display media content added to the favorites page.

Optionally, before the receiving a first trigger operation, the method further includes: displaying the first media content and first prompt information on the media content display page, and the first prompt information is used to prompt to add the first media content to the favorites folder; and displaying a favorites folder panel of the current user in response to a second trigger operation on the first prompt information, and the favorites folder panel is used to perform the first trigger operation.

Accordingly, as shown in FIG. 2, the interaction method provided in this embodiment may include the following steps.

S201: Display the first media content and the first prompt information on the media content display page, and the media content display page is used to display the media content added to the favorites page of the current user, and the first prompt information is used to prompt to add the first media content to the favorites folder.

The media content display page may correspond to a first interactive operation, and is used to display media content on which the current user has performed the first interactive operation, such as a display page of a media content stream on which the current user has performed the first interactive operation. For example, the media content stream on the media content display page may include at least part of media content on which the current user has performed the first interactive operation, and the media content display page may display the media content based on the media content stream. The first media content may be media content currently displayed on the media content display page, which is media content on which the current user has performed the first interactive operation.

The first prompt information may be information for prompting the user to add the first media content to the favorites folder, and may remain displayed while the media content display page is displayed, or may be displayed when a predetermined condition is satisfied. For example, the predetermined condition may include that the current user switches, within a predetermined duration after a current application is started this time, to a display page of the media content on which the current user has performed the first interactive operation or media content information of the media content on which the current user has performed the first interactive operation. In this case, when the predetermined condition is satisfied, the first prompt information may remain displayed on the media content display page during this display of the media content display page, or the first prompt information is displayed on the media content display page for the first m seconds of this display of the media content display page or when the first n pieces of media content of the media content stream on the media content display page are displayed, which may be specifically set as needed. The predetermined duration, m, and n may all be set as needed. For example, the predetermined duration may be set to a duration of 30 s or 60 s, etc., m may be 60 or 120, etc., and n may be set to 3 or 5, etc.

In this embodiment, when the media content on which the current user has performed the first interactive operation is displayed on the media content display page, the first prompt information may be displayed on the media content display page during display of the at least part of media content or at least for a set duration, to prompt, by using the first prompt information, the current user to add the currently displayed media content to a media content collection. A display style of the first prompt information and a display location of the first prompt information on the media content display page are not limited. For example, the first prompt information may be displayed in a form of a control, a pop-up window, etc.

Figure 3:
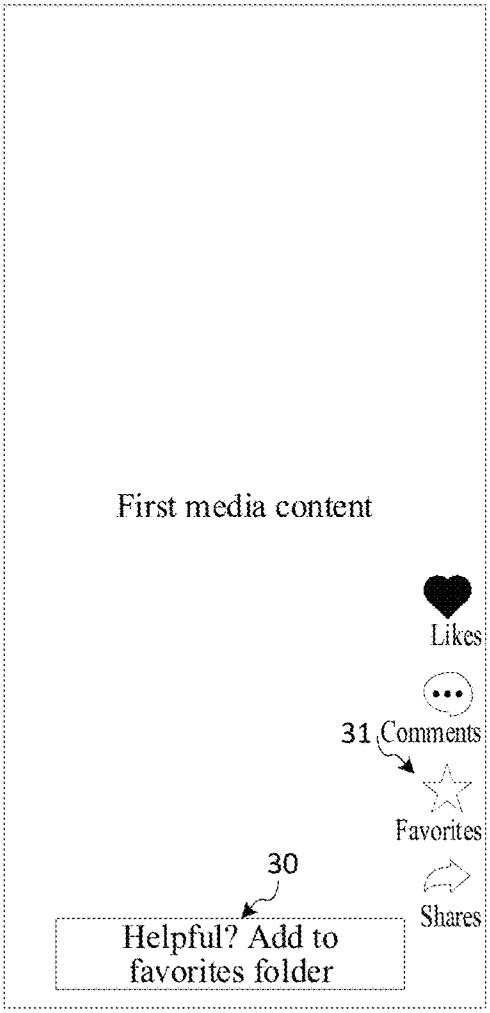
FIG. 3 is a schematic diagram of displaying first prompt information according to an embodiment of the present disclosure.

Taking the first interactive operation being a like operation and a second interactive operation being a favorite operation as an example, when the first media content liked by the user is displayed on the media content display page, first prompt information 30 may be further displayed on the media content display page, as shown in FIG. 3, to prompt the user to add the first media content to the favorites folder.

S202: Display the favorites folder panel of the current user in response to the second trigger operation on the first prompt information, and the favorites folder panel is used to perform the first trigger operation.

The second trigger operation may be considered as an operation of triggering the first prompt information displayed on the media content display page, such as an operation of clicking on the first prompt information. The favorites folder panel may be a panel for displaying at least part of favorites folders of the current user. The favorites folder panel may display favorites folder identifiers of the at least part of favorites folders of the current user, and may further display a favorites folder creation control. The favorites folder identifier may include, for example, at least one of a favorites folder name and a favorites folder icon. The favorites folder creation control may be used to trigger display of a favorites folder creation panel that may be used for the current user to create a new favorites folder.

Figure 4:
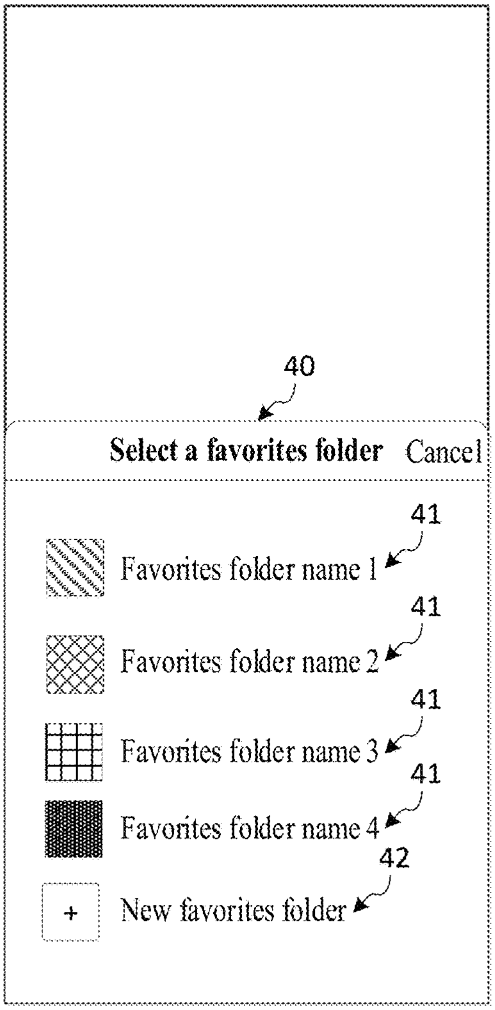
FIG. 4 is a schematic diagram of displaying a favorites folder panel according to an embodiment of the present disclosure.

Taking the first interactive operation being the like operation and the second interactive operation being the favorite operation as an example, when the second trigger operation is received, for example, when it is detected that the current user triggers the first prompt information 30, a favorites folder panel 40 may be displayed, and favorites folder identifiers 41 of the at least part of favorites folders of the current user may be displayed in the favorites folder panel 40, and a favorites folder creation control 42 may be further displayed in the favorites folder panel 40, as shown in FIG. 4.

S203: Receive the first trigger operation, and the first trigger operation is associated with at least one piece of media content that is media content on which the current user has performed the first interactive operation.

Taking the first interactive operation being the like operation and the second interactive operation being the favorite operation as an example, after the favorites folder panel is displayed, the current user may perform the first trigger operation by triggering a favorites folder identifier of a specific favorites folder. In this case, the favorites folder corresponding to the favorites folder identifier on which the first trigger operation acts is a favorites folder corresponding to the first trigger operation. Alternatively, the current user indicates, by triggering the favorites folder creation control, the current application to display the favorites folder creation panel, creates a new favorites folder in the favorites folder creation panel, and performs the first trigger operation. In this case, the favorites folder created by the current user in the favorites folder creation panel is a favorites folder corresponding to the first trigger operation.

S204: Add, in response to the first trigger operation, the first media content displayed on the media content display page to the favorites folder corresponding to the first trigger operation, and the favorites folder is displayed on the favorites page of the current user, the second media content collection is used to display media content on which the current user has performed the second interactive operation, and the second interactive operation includes the favorite operation.

In this embodiment, the first media content currently displayed on the media content display page may be added to the favorites folder corresponding to the first trigger operation when the first trigger operation is received on the media content display page corresponding to the first media content collection. For example, when it is detected that the current user triggers a specific favorites folder identifier in the favorites folder panel, it may be determined that the first trigger operation is received, and the first media content is added to a favorites folder corresponding to the favorites folder identifier. When it is detected that the current user triggers a confirm control in the favorites folder creation panel, it may be determined that the first trigger operation is received, and the first media content is added to a new favorites folder created by the current user this time in the favorites folder creation panel.

In addition, when the first media content is added to the favorites folder corresponding to the first trigger operation, the first media content may be further added outside each favorites folder on the favorites page. In other words, in this case, the first media content may be included outside each favorites folder on the favorites page of the current user, and may also be included in the favorites folder, corresponding to the first trigger operation, on the favorites page. When the first trigger operation is received, display of the favorites folder panel and the favorites folder creation panel may be further canceled, so that the current user views a media content picture of the first media content.

In some implementations, as shown in FIG. 3, when the first media content is displayed, a favorite control 31 corresponding to the first media content may be further displayed on the media content display page, and the current user may favorite the first media content by triggering the favorite control 31.

In the above implementation, when the user favorites the first media content by triggering the favorite control, the first media content may be added only to the favorites page of the current user but not to the favorites folder. In other words, the first media content is located on the favorites page of the current user but not in any favorites folder on the favorites page. In this case, optionally, the favorite control is further displayed on the media content display page, and the interaction method provided in this embodiment further includes: adding the first media content to the favorites page of the current user in response to the second interactive operation for the favorite control, and the first media content is not added to the favorites folder. Here, the favorite control is a different page element than the first prompt information.

It should be noted that in the prior art, some applications display favorite controls when displaying media content regardless of whether the current user has performed the first interactive operation on the media content, in other words, the favorite controls are displayed when each piece of media content is displayed, so that the user favorites the currently displayed media content. As a result, a way to favorite media content is undiversified. In this embodiment, when the at least part of media content on which the current user has performed the first interactive operation is displayed, the first prompt information may be further displayed, in addition to the favorite control, to prompt, by using the first prompt information, the user to favorite the at least one piece of media content on which the user has performed the first interactive operation, and to enable the user to trigger display of the favorites folder panel for selection of the favorites folder. Therefore, the way to favorite media content can be diversified.

According to the interaction method provided in this embodiment, when the first media content on which the user has performed the first interactive operation is displayed on the media content display page, the first prompt information is further displayed, and the favorites folder panel is displayed when the user triggers the first prompt information, so that the user selects the favorites folder in the favorites folder panel to favorite the first media content. Therefore, the approach to favorite media content can be diversified.

Figure 5:
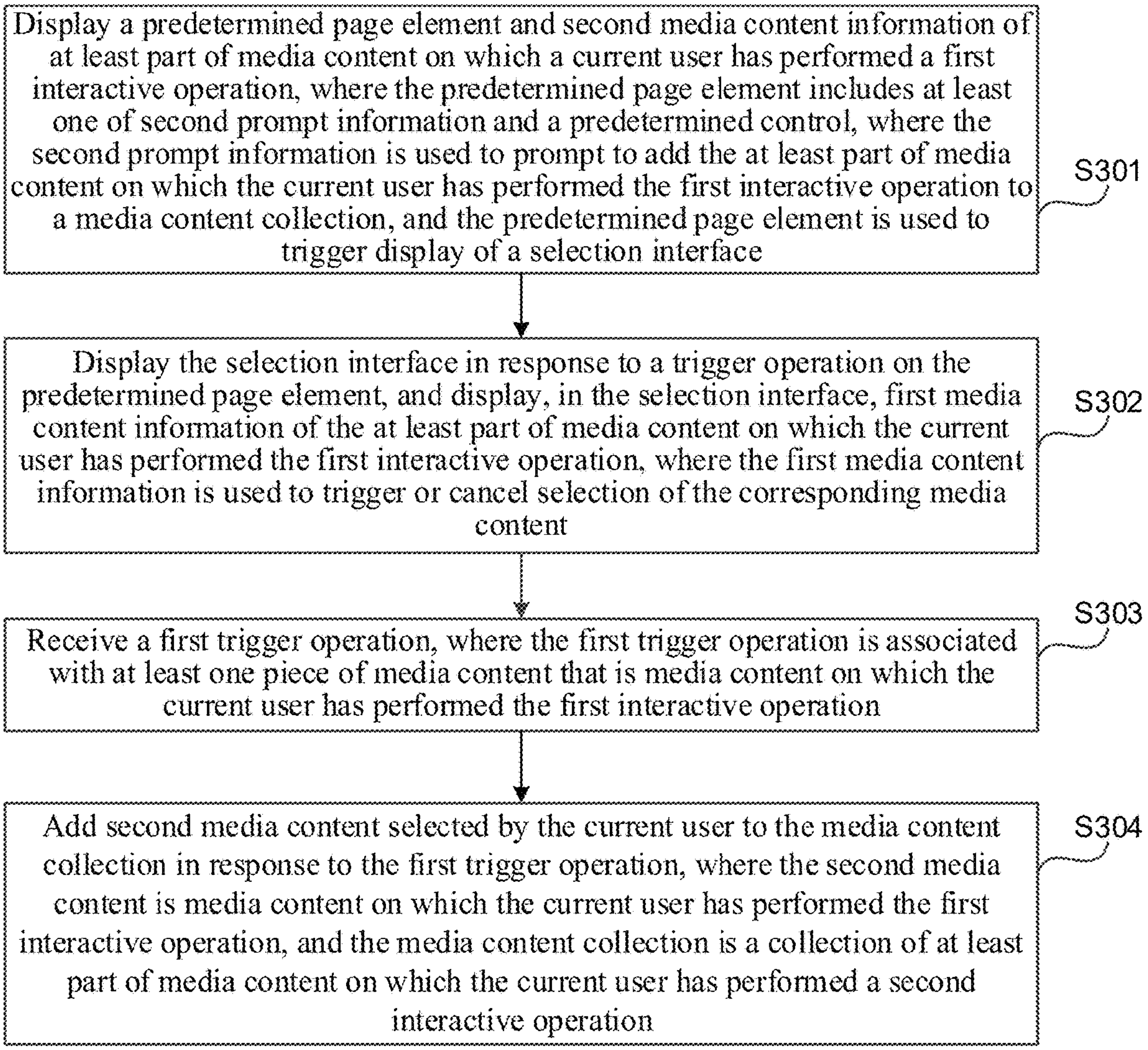
FIG. 5 is a schematic flowchart of another interaction method according to an embodiment of the present disclosure.

FIG. 5 is a schematic flowchart of still another interaction method according to an embodiment of the present disclosure. The solution in this embodiment may be combined with one or more optional solutions in the above embodiment. Optionally, the adding the at least one piece of media content to the media content collection includes: adding second media content selected by the current user to the media content collection, and the second media content is media content on which the current user has performed the first interactive operation.

Optionally, before the receiving a first trigger operation, the method further includes: displaying a selection interface, and displaying, in the selection interface, first media content information of at least part of media content on which the current user has performed the first interactive operation, and the first media content information is used to trigger or cancel selection of the respective media content.

Optionally, before the displaying a selection interface, the method further includes: displaying a predetermined page element and second media content information of the at least part of media content on which the current user has performed the first interactive operation, where the predetermined page element includes at least one of second prompt information and a predetermined control, and the second prompt information is used to prompt to add the at least part of media content on which the current user has performed the first interactive operation to the second media content collection, and the predetermined page element is used to trigger display of the selection interface.

Accordingly, as shown in FIG. 5, the interaction method provided in this embodiment may include the following steps.

S301: Display the predetermined page element and the second media content information of the at least part of media content on which the current user has performed the first interactive operation, and the predetermined page element includes at least one of the second prompt information and the predetermined control. The second prompt information is used to prompt to add the at least part of media content on which the current user has performed the first interactive operation to the media content collection, and the predetermined page element is used to trigger display of the selection interface.

In this embodiment, the predetermined page element may be displayed when the second media content information of the at least part of media content on which the current user has performed the first interactive operation is displayed, so that the user enters the selection interface by triggering the predetermined page element.

The second media content information may be information of media content on which the user has performed the first interactive operation. Taking the first interactive operation being a like operation as an example, the second media content information may be media content information displayed in a likes collection of the current user. In this case, the predetermined page element may be displayed when the likes collection of the current user is displayed. The second media content information may include, for example, information such as a name and a cover of the corresponding media content. The likes collection may be understood as a collection of at least part of media content on which the current user has performed the like operation, such as a likes page or likes list of the current user. The predetermined page element may be displayed in the form of prompt information or a control. For example, the predetermined page element may include at least one of the second prompt information and the predetermined control. The second prompt information may be information for prompting the current user to add the at least part of media content on which the current user has performed the first interactive operation to the media content collection. The predetermined control may be a control for triggering display of the selection interface, such as a management control for media content on which the current user has performed the first interactive operation.

Figure 6:
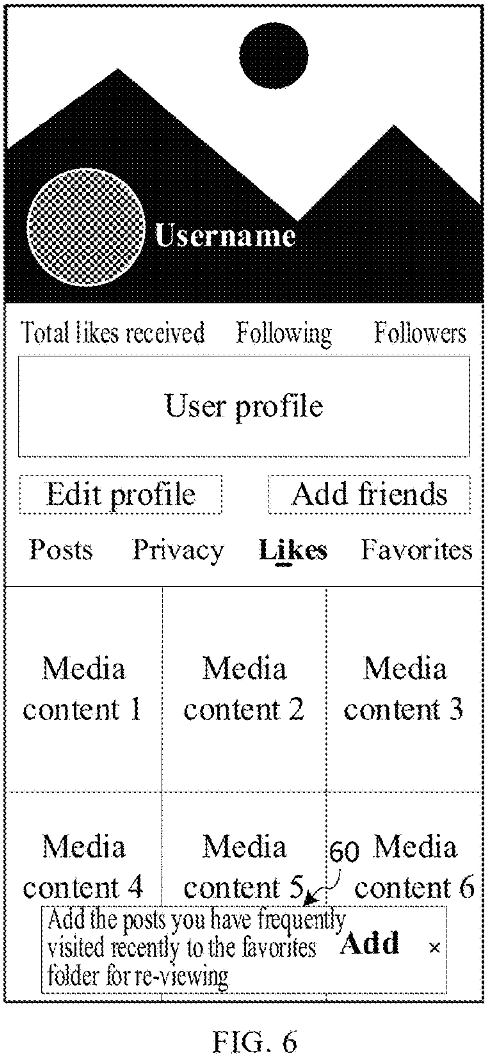
FIG. 6 is a schematic diagram of displaying second prompt information according to an embodiment of the present disclosure.
Figure 7:
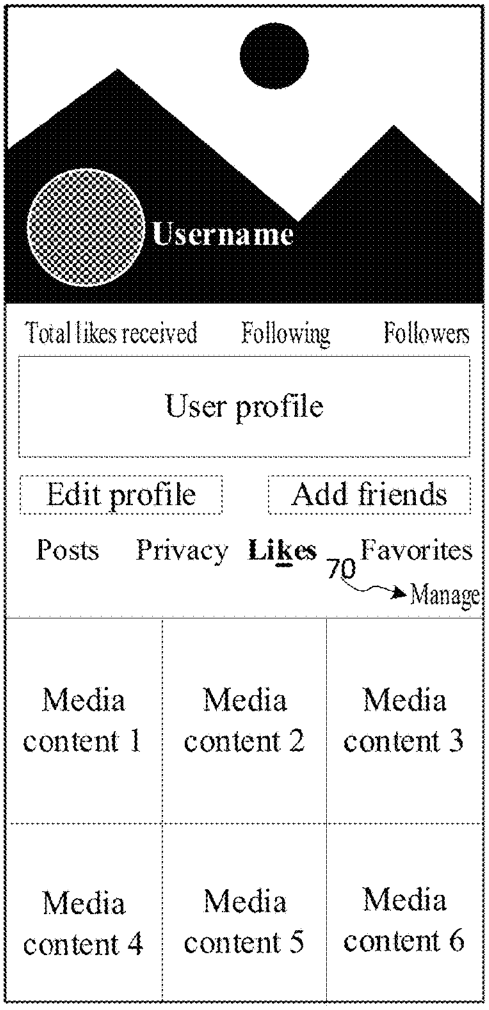
FIG. 7 is a schematic diagram of displaying a predetermined control according to an embodiment of the present disclosure.

Taking the first interactive operation being the like operation and a second interactive operation being a favorite operation as an example, when the second media content information of the media content on which the current user has performed the first interactive operation is displayed, for example, when a page or a list of the media content on which the current user has performed the first interactive operation is displayed, the predetermined page element may be further displayed, for example, second prompt information 60 is further displayed (as shown in FIG. 6), or a predetermined control 70 is further displayed (as shown in FIG. 7).

S302: Display the selection interface in response to a trigger operation on the predetermined page element, and display, in the selection interface, the first media content information of the at least part of media content on which the current user has performed the first interactive operation, and the first media content information is used to trigger or cancel selection of the respective media content.

Figure 8:
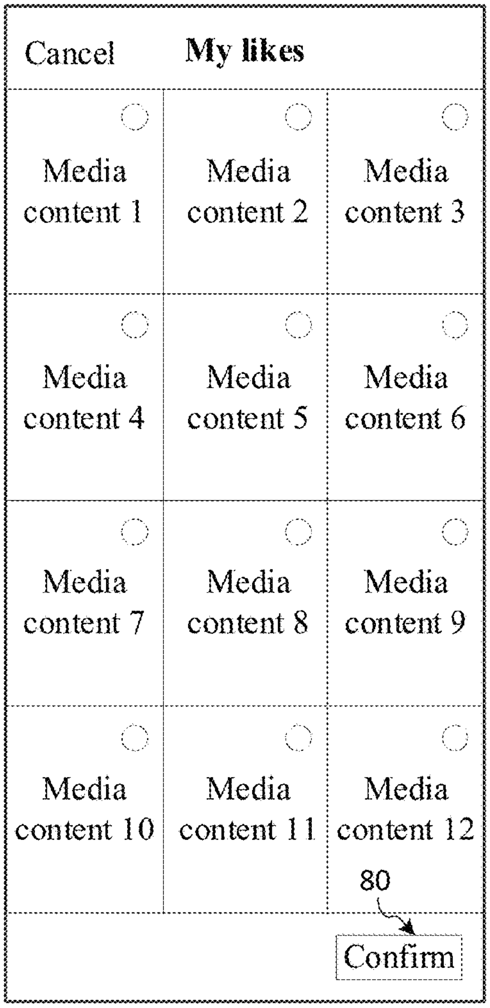
FIG. 8 is a schematic diagram of displaying a selection interface according to an embodiment of the present disclosure.
Figure 9:
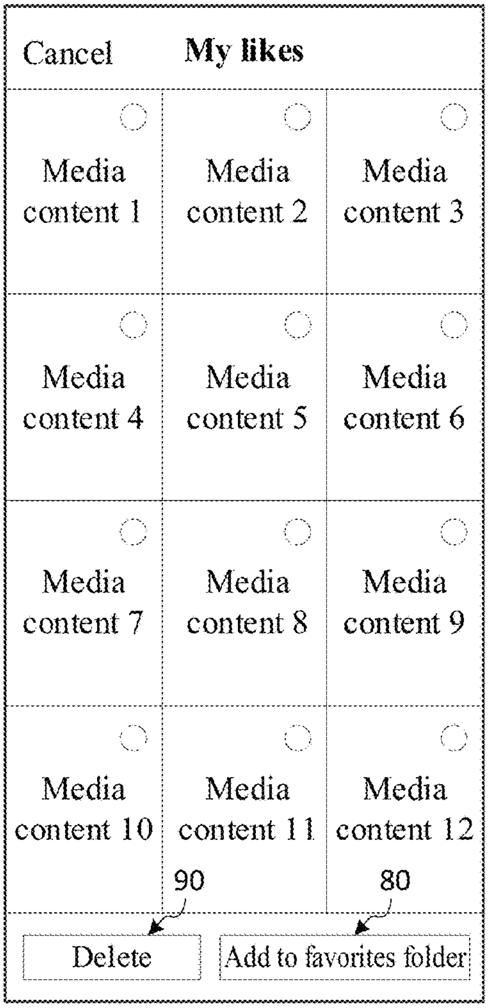
FIG. 9 is a schematic diagram of displaying another selection interface according to an embodiment of the present disclosure.

For example, when it is detected that the current user triggers the predetermined page element, the selection interface may be displayed, and the first media content information of the at least part of media content on which the current user has performed the first interactive operation may be displayed in the selection interface, as shown in FIG. 8 and FIG. 9, so that the current user selects, in a media content selection interface, media content to be added by the current user to the media content collection, or media content to be managed by the current user. The second media content information may be considered as media content information displayed in the selection interface, and may include identification information of the media content, such as a cover and/or a name of the media content.

In this embodiment, a selection complete control may be further displayed in the selection interface, which may be used to trigger a first trigger operation to be performed. Alternatively, when the second interactive operation includes the favorite operation, for example, when the media content collection is a favorites page or a favorites folder, the selection complete control may be further used to trigger display of a favorites folder panel of the current user or a favorites folder creation panel, so that the current user selects or creates a favorites folder to which the selected media content is to be added by the current user. In this case, optionally, the second interactive operation includes the favorite operation, and the selection complete control is further displayed in the selection interface, and the selection complete control is used to perform the first trigger operation or trigger display of a predetermined panel. The predetermined panel includes at least one of the favorites folder panel of the current user and the favorites folder creation panel and is used to perform the first trigger operation.

S303: Receive the first trigger operation, and the first trigger operation is associated with at least one piece of media content that is media content on which the current user has performed the first interactive operation.

For example, the user may perform the first trigger operation by triggering the second prompt information, a specific favorites folder identifier in the favorites folder panel, or a confirm control in the favorites folder creation panel.

S304: Add second media content selected by the current user to the media content collection in response to the first trigger operation, and the second media content is media content on which the current user has performed the first interactive operation, and the media content collection is a collection of at least part of media content on which the current user has performed the second interactive operation.

For example, the second media content may be added to the media content collection when the first trigger operation is received. The second media content may be understood as media content selected by the current user in the selection interface.

In this embodiment, when the first trigger operation is received, the second media content may be added only to the favorites page of the current user but not to the favorites folder, or the second media content may be added to the favorites folder, which may be specifically set as needed.

In this case, optionally, the second interactive operation includes the favorite operation, and the adding second media content selected by the current user to the media content collection includes: adding the second media content selected by the current user to the favorites page of the current user, and the second media content is not added to the favorites folder; or adding the second media content selected by the current user to a favorites folder corresponding to the first trigger operation, and the favorites folder is displayed on the favorites page of the current user.

For example, when there is no favorites folder corresponding to the first trigger operation, the second media content may be added only to the favorites page of the current user, for example, the second media content is added outside each favorites folder on the favorites page; or when there is the favorites folder corresponding to the first trigger operation, the second media content may be added to the favorites folder corresponding to the first trigger operation.

When a specific piece of media content (such as the first media content or the second media content) is added to the favorites folder corresponding to the first trigger operation, the media content may or may not be added outside each favorites folder on the favorites page. For example, the favorites page may include a favorites folder page and a favorite media content page. Under a page identifier corresponding to the favorites page, there may be a subpage identifier corresponding to the favorites folder page and a subpage identifier corresponding to the favorite media content page. The subpage identifier corresponding to the favorites folder page may be used to trigger display of the favorites folder page. The subpage identifier corresponding to the favorite media content page may be used to trigger display of the favorite media content page. The favorites folder page may be used to display a favorites folder of the current user. The favorite media content page may be used to display media content information of media content favorited by the current user. Therefore, when a specific piece of media content is added to the favorites page but not to a favorites folder, the media content may be added only to the favorite media content page. When a specific piece of media content is added to a specific favorites folder, the media content may be added only to the favorites folder on the favorites folder page but not to the favorite media content page, or the media content is added to the favorites folder on the favorites folder page, and the favorite media content page.

The following provides, by taking the first interactive operation being a like operation and the second interactive operation being the favorite operation as an example, exemplary descriptions of some ways to favorite the media content on which the user has performed the first interactive operation.

In some implementations, the second prompt information 60 may be further displayed, as shown in FIG. 6, when the likes collection of the current user is displayed. When it is detected that the current user triggers the second prompt information 60, a selection interface corresponding to the likes collection is displayed, and media content information of at least part of media content in the likes collection, and a selection complete control 80 are displayed in the selection interface, as shown in FIG. 8.

Figure 10:
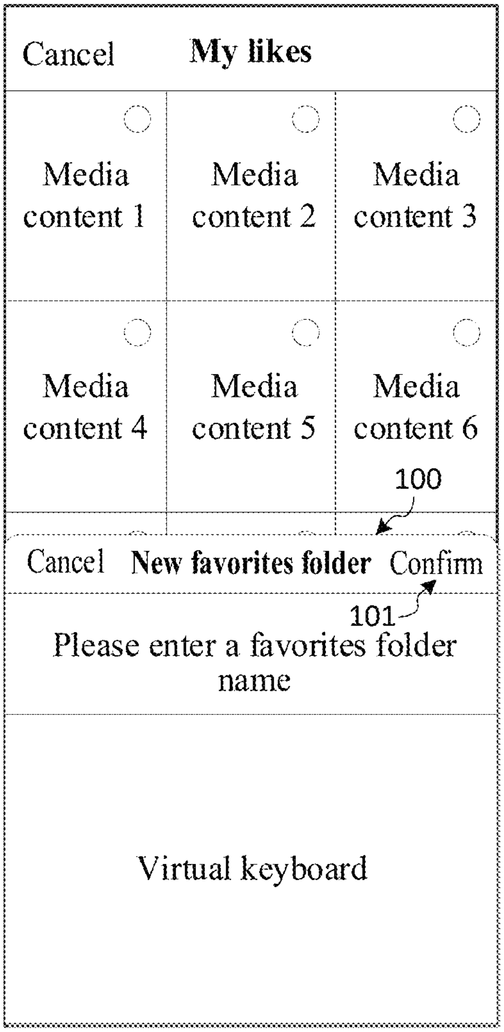
FIG. 10 is a schematic diagram of displaying a favorites folder creation panel according to an embodiment of the present disclosure.

Therefore, when it is detected that the current user triggers the selection complete control 80, it may be determined that the first trigger operation is received, and media content selected by the current user in the selection interface is added to the favorites page in response to the first trigger operation. In this case, the media content selected by the current user may not be added to the favorites folder in response to the first trigger operation. Alternatively, when it is detected that the current user triggers the selection complete control 80, a favorites folder creation panel 100 may be displayed, as shown in FIG. 10, so that the current user creates a new favorites folder. When it is detected that the current user triggers a confirm control 101 displayed in the favorites folder creation panel, it is determined that the first trigger operation is received; and in response to the first trigger operation, the new favorites folder is created, and media content selected by the current user in the selection interface is added to the new favorites folder.

In some other implementations, the predetermined control 70 may be further displayed, as shown in FIG. 7, when a first media content list is displayed. When it is detected that the current user triggers the predetermined control 70, a selection interface corresponding to the likes collection is displayed, and media content information of at least part of media content in the likes collection, and a selection complete control 80 are displayed in the selection interface, as shown in FIG. 9. When it is detected that the current user triggers the selection complete control 80, the favorites folder panel is displayed in the selection interface.

Therefore, when it is detected that the current user triggers a specific favorites folder identifier in the favorites folder panel, it may be determined that the first trigger operation is received, and media content selected by the current user in the selection interface is added, in response to the first trigger operation, to a favorites folder corresponding to the favorites folder identifier.

When it is detected that the current user triggers the favorites folder creation control in the favorites folder panel, the favorites folder creation panel may be displayed, so that the current user creates a new favorites folder in the favorites folder creation panel. When it is detected that the current user triggers a confirm control in the favorites folder creation panel, it is determined that the first trigger operation is received, and media content selected by the current user in the selection interface is added, in response to the first trigger operation, to the new favorites folder created by the current user this time in the favorites folder creation panel.

In this embodiment, after the first trigger operation is received, the selection interface may remain displayed, or the second media content information of the at least part of media content on which the current user has performed the first interactive operation is redisplayed. Alternatively, when there is the favorites folder corresponding to the first trigger operation, the favorites folder to which the second media content is added may be displayed for the current user to view. In this case, optionally, the adding the second media content selected by the current user to a favorites folder corresponding to the first trigger operation includes: adding the second media content selected by the current user to the favorites folder corresponding to the first trigger operation, and displaying the favorites folder corresponding to the first trigger operation.

In some implementations, after the displaying the selection interface, the method further includes at least one of the following: canceling, in response to a third trigger operation acting in the selection interface, the first interactive operation performed by the current user on the selected second media content; and canceling, in response to a fourth trigger operation in the media content collection, the first interactive operation performed by the current user on third media content, and the third media content is invalid media content.

The third trigger operation may be a trigger operation for indicating cancellation of the first interactive operation performed by the current user on the media content selected by the current user in the selection interface, such as an operation of triggering a delete control displayed in the selection interface. The fourth trigger operation may be an operation for indicating cancellation of the first interactive operation performed by the current user on the invalid media content on which the current user has performed the first interactive operation, such as a trigger operation of triggering a cleanup control displayed in the selection interface. The cleanup control may be displayed when there is the invalid media content on which the current user has performed the first interactive operation. The invalid media content may include, for example, media content deleted by a poster. The third media content may be understood as invalid media content on which the current user has performed the first interactive operation.

In the above implementation, the current user may cancel, in the selection interface, the first interactive operation performed by the current user on the at least part of media content, in addition to adding the selected media content in the selection interface to the media content collection.

For example, when the third trigger operation is received, for example, when it is detected that the current user triggers a delete control 90 (as shown in FIG. 9) displayed in the selection interface, the first interactive operation performed by the current user on the second media content selected by the current user in the selection interface may be canceled, for example, canceling the like for the second media content. When the fourth trigger operation is received, for example, when it is detected that the current user triggers the cleanup control displayed in the selection interface, the first interactive operation performed by the current user on the invalid media content may be canceled, for example, canceling the like for the invalid media content.

According to the interaction method provided in this embodiment, the predetermined page element is further displayed when the second media content information of the media content on which the current user has performed the first interactive operation is displayed, and the selection interface is displayed when the user triggers the predetermined page element, so that the user selects the media content to be added by the user to the media content collection. Therefore, an approach to favorite media content can be further enriched.

Figure 11:
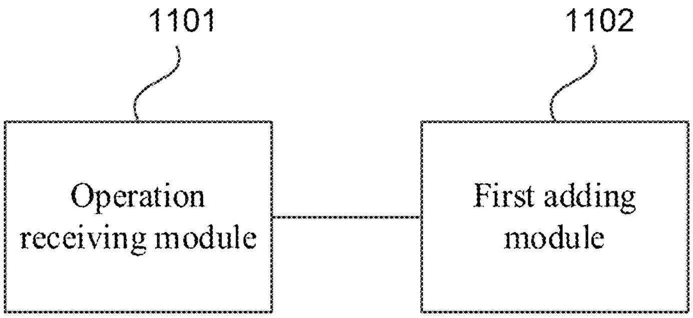
FIG. 11 is a block diagram of a structure of an interaction apparatus according to an embodiment of the present disclosure.

FIG. 11 is a block diagram of a structure of an interaction apparatus according to an embodiment of the present disclosure. The apparatus may be implemented by software and/or hardware, may be configured in an electronic device, typically in a mobile phone or a tablet computer, and may add, by performing an interaction method, at least part of media content on which an interactive operation has been performed to a media content collection on which another interactive operation has been performed, for example, add at least part of liked media content to a favorites list. As shown in FIG. 11, the interaction apparatus provided in this embodiment may include an operation receiving module 1101 and a first adding module 1102.

The operation receiving module 1101 is configured to receive a first trigger operation, and the first trigger operation is associated with at least one piece of media content that is media content on which a current user has performed a first interactive operation.

The first adding module 1102 is configured to add the at least one piece of media content to a media content collection in response to the first trigger operation, and the media content collection is a collection of at least part of media content on which the current user has performed a second interactive operation.

According to the interaction apparatus provided in this embodiment, the operation receiving module receives the first trigger operation associated with the at least one piece of media content, and the at least one piece of media content is the media content on which the current user has performed the first interactive operation. The first adding module adds the at least one piece of media content to the media content collection in response to the first trigger operation, and the media content collection is the collection of the at least part of media content on which the current user has performed the second interactive operation. According to this embodiment, with the above technical solution, the user may perform the first trigger operation to add the at least one piece of media content on which the user has performed the first interactive operation to the media content collection on which the user has performed the second interactive operation. This can diversify an approach to add media content to the media content collection on which the second interactive operation has been performed, thereby diversifying a way to perform the second interactive operation.

In the above solution, the second interactive operation may include a favorite operation. The first adding module 1102 may be configured to add first media content displayed on a media content display page to a favorites folder corresponding to the first trigger operation, and the favorites folder is displayed on a favorites page of the current user, and the media content display page is used to display media content added to the favorites page.

Further, the interaction apparatus provided in this embodiment may further include: a prompt module configured to display the first media content and first prompt information on the media content display page before the first trigger operation is received, and the first prompt information is used to prompt to add the first media content to the favorites folder; and a favorites folder panel display module configured to display a favorites folder panel of the current user in response to a second trigger operation on the first prompt information, and the favorites folder panel is used to perform the first trigger operation.

In the above solution, a favorite control is further displayed on the media content display page. The interaction apparatus provided in this embodiment may further include a second adding module configured to add the first media content to the favorites page of the current user in response to the second interactive operation for the favorite control, and the first media content is not added to the favorites folder.

In the above solution, the first adding module 1102 may be configured to add second media content selected by the current user to the media content collection, and the second media content is media content on which the current user has performed the first interactive operation.

In the above solution, the second interactive operation may include a favorite operation. The first adding module 1102 may include: a first adding unit configured to add the second media content selected by the current user to a favorites page of the current user, and the second media content is not added to a favorites folder; or a second adding unit configured to add the second media content selected by the current user to a favorites folder corresponding to the first trigger operation, and the favorites folder is displayed on a favorites page of the current user.

In the above solution, the second adding unit may be configured to add the second media content selected by the current user to the favorites folder corresponding to the first trigger operation, and display the favorites folder corresponding to the first trigger operation.

Further, the interaction apparatus provided in this embodiment may further include a selection interface display module configured to display a selection interface, and display, in the selection interface, first media content information of at least part of media content on which the current user has performed the first interactive operation, and the first media content information is used to trigger or cancel selection of the respective media content.

In the above solution, the second interactive operation may include a favorite operation, and a selection complete control may be further displayed in the selection interface, and the selection complete control may be used to perform the first trigger operation or trigger display of a predetermined panel, and the predetermined panel may include at least one of a favorites folder panel of the current user and a favorites folder creation panel, and the predetermined panel may be used to perform the first trigger operation.

Further, the interaction apparatus provided in this embodiment may further include: a first cancellation module configured to: after the selection interface is displayed, cancel, in response to a third trigger operation acting in the selection interface, the first interactive operation performed by the current user on the selected second media content; and a second cancellation module configured to: after the selection interface is displayed, cancel, in response to a fourth trigger operation in the media content collection, the first interactive operation performed by the current user on third media content, and the third media content is invalid media content.

Further, the interaction apparatus provided in this embodiment may further include an element display module configured to: before the selection interface is displayed, display a predetermined page element and second media content information of the at least part of media content on which the current user has performed the first interactive operation, and the predetermined page element includes at least one of second prompt information and a predetermined control, and the second prompt information is used to prompt to add the at least part of media content on which the current user has performed the first interactive operation to the media content collection, and the predetermined page element is used to trigger display of the selection interface.

The interaction apparatus provided in this embodiment of the present disclosure may perform the interaction method provided in any embodiment of the present disclosure, and has corresponding functional modules and beneficial effects for performing the interaction method. For technical details not described in detail in this embodiment, reference may be made to the interaction method provided in any embodiment of the present disclosure.

Figure 12:
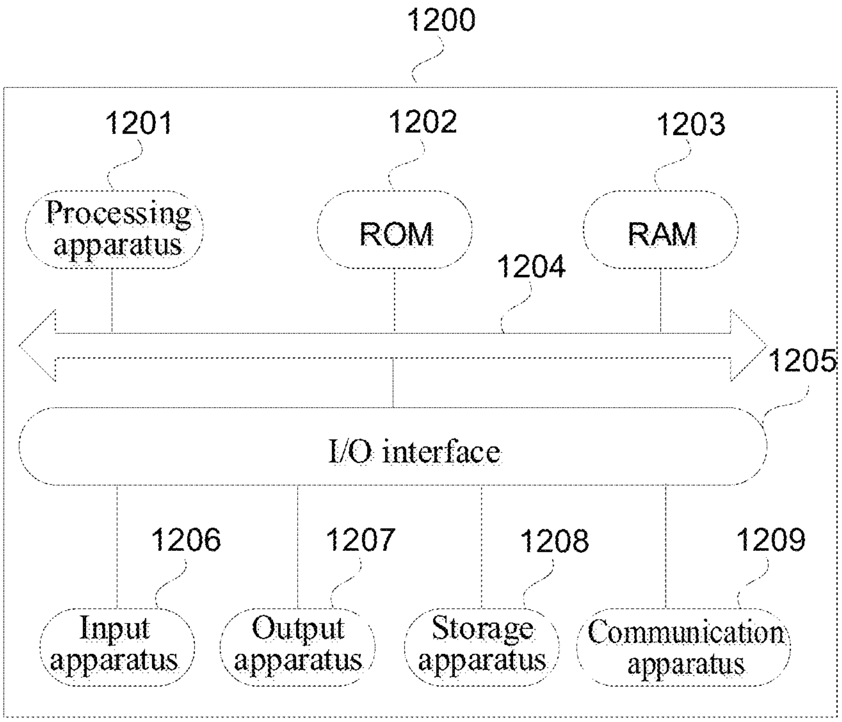
FIG. 12 is a schematic diagram of a structure of an electronic device according to an embodiment of the present disclosure.

Reference is made to FIG. 12 below, which is a schematic diagram of a structure of an electronic device (such as a terminal device) 1200 suitable for implementing an embodiment of the present disclosure. The terminal device in this embodiment of the present disclosure may include but is not limited to mobile terminals such as a mobile phone, a notebook computer, a digital broadcast receiver, a personal digital assistant (PDA), a PAD (tablet computer), a portable multimedia player (PMP), and a vehicle-mounted terminal (such as a vehicle navigation terminal), and fixed terminals such as a digital TV and a desktop computer. The electronic device shown in FIG. 12 is merely an example, and shall not impose any limitation on the function and scope of use of the embodiments of the present disclosure.

As shown in FIG. 12, the electronic device 1200 may include a processing apparatus (such as a central processing unit or a graphics processing unit) 1201 that may perform a variety of appropriate actions and processing in accordance with a program stored in a read-only memory (ROM) 1202 or a program loaded from a storage apparatus 1208 into a random access memory (RAM) 1203. The RAM 1203 further stores various programs and data required for the operation of the electronic device 1200. The processing apparatus 1201, the ROM 1202, and the RAM 1203 are connected to one another through a bus 1204. An input/output (I/O) interface 1205 is also connected to the bus 1204.

Generally, the following apparatuses may be connected to the I/O interface 1205; an input apparatus 1206 including, for example, a touchscreen, a touchpad, a keyboard, a mouse, a camera, a microphone, an accelerometer, and a gyroscope; an output apparatus 1207 including, for example, a liquid crystal display (LCD), a speaker, and a vibrator; the storage apparatus 1208 including, for example, a tape and a hard disk; and a communication apparatus 1209. The communication apparatus 1209 may allow the electronic device 1200 to perform wireless or wired communication with other devices to exchange data. Although FIG. 12 shows the electronic device 1200 having various apparatuses, it should be understood that it is not required to implement or have all of the shown apparatuses. It may be an alternative to implement or have more or fewer apparatuses.

In particular, according to an embodiment of the present disclosure, the process described above with reference to the flowchart may be implemented as a computer software program. For example, this embodiment of the present disclosure includes a computer program product, which includes a computer program carried on a non-transitory computer-readable medium, where the computer program includes program code for performing the method shown in the flowchart. In such an embodiment, the computer program may be downloaded and installed from a network via the communication apparatus 1209, installed from the storage apparatus 1208, or installed from the ROM 1202. The computer program, when executed by the processing apparatus 1201, causes the above-mentioned functions defined in the method according to the embodiments of the present disclosure to be performed.

It should be noted that the above computer-readable medium described in the present disclosure may be a computer-readable signal medium, a computer-readable storage medium, or any combination thereof. The computer-readable storage medium may be, for example but not limited to, electric, magnetic, optical, electromagnetic, infrared, or semiconductor systems, apparatuses, or devices, or any combination thereof. More specific examples of the computer-readable storage medium may include but are not limited to: an electrical connection having one or more wires, a portable computer magnetic disk, a hard disk, a random access memory (RAM), a read-only memory (ROM), an erasable programmable read-only memory (EPROM) (or a flash memory), an optical fiber, a portable compact disc read-only memory (CD-ROM), an optical storage device, a magnetic storage device, or any suitable combination thereof. In the present disclosure, the computer-readable storage medium may be any tangible medium containing or storing a program which may be used by or in combination with an instruction execution system, apparatus, or device. In the present disclosure, the computer-readable signal medium may include a data signal propagated in a baseband or as a part of a carrier, the data signal carrying computer-readable program code. The propagated data signal may be in various forms, including but not limited to an electromagnetic signal, an optical signal, or any suitable combination thereof. The computer-readable signal medium may further be any computer-readable medium other than the computer-readable storage medium. The computer-readable signal medium can send, propagate, or transmit a program used by or in combination with an instruction execution system, apparatus, or device. The program code contained in the computer-readable medium may be transmitted by any suitable medium, including but not limited to: electric wires, optical cables, radio frequency (RF), etc., or any suitable combination thereof.

In some implementations, a client and a server may communicate using any currently known or future-developed network protocol such as the Hypertext Transfer Protocol (HTTP), and may be connected to digital data communication (for example, a communication network) in any form or medium. Examples of the communication network include a local area network ("LAN"), a wide area network ("WAN"), an internetwork (for example, the Internet), a peer-to-peer network (for example, an ad hoc peer-to-peer network), and any currently known or future-developed network.

The above computer-readable medium may be contained in the above electronic device. Alternatively, the computer-readable medium may exist independently, without being assembled into the electronic device.

The above computer-readable medium carries one or more programs that, when executed by the electronic device, cause the electronic device to: receive a first trigger operation, where the first trigger operation is associated with at least one piece of media content that is media content on which a current user has performed a first interactive operation; and add the at least one piece of media content to a media content collection in response to the first trigger operation, where the media content collection is a collection of at least part of media content on which the current user has performed a second interactive operation.

Computer program code for performing operations of the present disclosure can be written in one or more programming languages or a combination thereof, where the programming languages include but are not limited to object-oriented programming languages, such as Java, Smalltalk, and C++, and further include conventional procedural programming languages, such as "C" language or similar programming languages. The program code may be completely executed on a computer of a user, partially executed on a computer of a user, executed as an independent software package, partially executed on a computer of a user and partially executed on a remote computer, or completely executed on a remote computer or server. In the case of the remote computer, the remote computer may be connected to the computer of the user through any kind of network, including a local area network (LAN) or a wide area network (WAN), or may be connected to an external computer (for example, connected through the Internet with the aid of an Internet service provider).

The flowchart and block diagram in the accompanying drawings illustrate the possibly implemented architecture, functions, and operations of the system, method, and computer program product according to various embodiments of the present disclosure. In this regard, each block in the flowchart or block diagram may represent a module, program segment, or part of code, and the module, program segment, or part of code contains one or more executable instructions for implementing the specified logical functions. It should also be noted that, in some alternative implementations, the functions marked in the blocks may also occur in an order different from that marked in the accompanying drawings. For example, two blocks shown in succession can actually be performed substantially in parallel, or they can sometimes be performed in the reverse order, depending on the functions involved. It should also be noted that each block in the block diagram and/or the flowchart, and a combination of the blocks in the block diagram and/or the flowchart may be implemented by a dedicated hardware-based system that executes specified functions or operations, or may be implemented by a combination of dedicated hardware and computer instructions.

The related units described in the embodiments of the present disclosure may be implemented by software, or may be implemented by hardware. The name of a module does not constitute a limitation on the unit itself in some cases.

The functions described herein above may be performed at least partially by one or more hardware logic components. For example, without limitation, exemplary types of hardware logic components that may be used include: a field programmable gate array (FPGA), an application-specific integrated circuit (ASIC), an application-specific standard product (ASSP), a system-on-chip (SOC), a complex programmable logic device (CPLD), and the like.

In the context of the present disclosure, a machine-readable medium may be a tangible medium that may contain or store a program used by or in combination with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM) (or a flash memory), an optic fiber, a portable compact disc read-only memory (CD-ROM), an optical storage device, a magnetic storage device, or any suitable combination thereof.

According to one or more embodiments of the present disclosure, Example 1 provides an interaction method. The method includes:

receiving a first trigger operation, where the first trigger operation is associated with at least one piece of media content that is media content on which a current user has performed a first interactive operation; and adding the at least one piece of media content to a media content collection in response to the first trigger operation, where the media content collection is a collection of at least part of media content on which the current user has performed a second interactive operation.

According to one or more embodiments of the present disclosure, Example 2 is based on the method in Example 1, where the second interactive operation includes a favorite operation, and the adding the at least one piece of media content to a media content collection includes:

adding first media content displayed on a media content display page to a favorites folder corresponding to the first trigger operation, where the favorites folder is displayed on a favorites page of the current user, and the media content display page is used to display media content added to the favorites page.

According to one or more embodiments of the present disclosure, Example 3 is based on the method in Example 2, where before the receiving a first trigger operation, the method further includes:

displaying the first media content and first prompt information on the media content display page, where the first prompt information is used to prompt to add the first media content to the favorites folder; and displaying a favorites folder panel of the current user in response to a second trigger operation on the first prompt information, where the favorites folder panel is used to perform the first trigger operation.

According to one or more embodiments of the present disclosure, Example 4 is based on the method in Example 3, where a favorite control is further displayed on the media content display page, and the method further includes:

adding the first media content to the favorites page of the current user in response to the second interactive operation for the favorite control, where the first media content is not added to the favorites folder.

According to one or more embodiments of the present disclosure, Example 5 is based on the method in Example 1, where the adding the at least one piece of media content to a media content collection includes:

adding second media content selected by the current user to the media content collection, where the second media content is media content on which the current user has performed the first interactive operation.

According to one or more embodiments of the present disclosure, Example 6 is based on the method in Example 5, where the second interactive operation includes a favorite operation, and the adding second media content selected by the current user to the media content collection includes:

adding the second media content selected by the current user to a favorites page of the current user, where the second media content is not added to a favorites folder; or adding the second media content selected by the current user to a favorites folder corresponding to the first trigger operation, where the favorites folder is displayed on a favorites page of the current user.

According to one or more embodiments of the present disclosure, Example 7 is based on the method in Example 6, where the adding the second media content selected by the current user to a favorites folder corresponding to the first trigger operation includes:

adding the second media content selected by the current user to the favorites folder corresponding to the first trigger operation, and displaying the favorites folder corresponding to the first trigger operation.

According to one or more embodiments of the present disclosure, Example 8 is based on the method in Example 5, where before the receiving a first trigger operation, the method further includes:

displaying a selection interface, and displaying, in the selection interface, first media content information of at least part of media content on which the current user has performed the first interactive operation, where the first media content information is used to trigger or cancel selection of the respective media content.

According to one or more embodiments of the present disclosure, Example 9 is based on the method in Example 8, where the second interactive operation includes a favorite operation, and a selection complete control is further displayed in the selection interface, where the selection complete control is used to perform the first trigger operation or trigger display of a predetermined panel, where the predetermined panel includes at least one of a favorites folder panel of the current user and a favorites folder creation panel, and the predetermined panel is used to perform the first trigger operation.

According to one or more embodiments of the present disclosure, Example 10 is based on the method in Example 8, where after the displaying a selection interface, the method further includes:

canceling, in response to a third trigger operation acting in the selection interface, the first interactive operation performed by the current user on the selected second media content; and canceling, in response to a fourth trigger operation in the media content collection, the first interactive operation performed by the current user on third media content, where the third media content is invalid media content.

According to one or more embodiments of the present disclosure, Example 11 is based on the method in Example 8, where before the displaying a selection interface, the method further includes:

displaying a predetermined page element and second media content information of the at least part of media content on which the current user has performed the first interactive operation, where the predetermined page element includes at least one of second prompt information and a predetermined control, where the second prompt information is used to prompt to add the at least part of media content on which the current user has performed the first interactive operation to the media content collection, and the predetermined page element is used to trigger display of the selection interface.

According to one or more embodiments of the present disclosure, Example 12 provides an interaction apparatus. The apparatus includes:

an operation receiving module configured to receive a first trigger operation, where the first trigger operation is associated with at least one piece of media content that is media content on which a current user has performed a first interactive operation; and a first adding module configured to add the at least one piece of media content to a media content collection in response to the first trigger operation, where the media content collection is a collection of at least part of media content on which the current user has performed a second interactive operation.

According to one or more embodiments of the present disclosure, Example 13 provides an electronic device. The electronic device includes:

one or more processors; and a memory configured to store one or more programs, where the one or more programs, when executed by the one or more processors, cause the one or more processors to implement the interaction method according to any one of Examples 1 to 11.

According to one or more embodiments of the present disclosure, Example 14 provides a computer-readable storage medium having a computer program stored thereon, where the computer program, when executed by a processor, causes the interaction method according to any one of Examples 1 to 11 to be implemented.

The foregoing descriptions are merely preferred embodiments of the present disclosure and explanations of the applied technical principles. Those skilled in the art should understand that the scope of disclosure involved in the present disclosure is not limited to the technical solutions formed by specific combinations of the foregoing technical features, and shall also cover other technical solutions formed by any combination of the foregoing technical features or equivalent features thereof without departing from the foregoing concept of disclosure. For example, a technical solution formed by a replacement of the foregoing features with technical features with similar functions disclosed in the present disclosure (but not limited thereto) also falls within the scope of the present disclosure.

In addition, although the various operations are depicted in a specific order, it should not be construed as requiring these operations to be performed in the specific order shown or in a sequential order. Under certain circumstances, multitasking and parallel processing may be advantageous. Similarly, although several specific implementation details are included in the foregoing discussions, these details should not be construed as limiting the scope of the present disclosure. Some features that are described in the context of separate embodiments can also be implemented in combination in a single embodiment. In contrast, various features described in the context of a single embodiment may alternatively be implemented in a plurality of embodiments individually or in any suitable sub combination.

Although the subject matter has been described in a language specific to structural features and/or logical actions of the method, it should be understood that the subject matter defined in the appended claims is not necessarily limited to the specific features or actions described above. In contrast, the specific features and actions described above are merely exemplary forms of implementing the claims.

We claim:

1. An interaction method, comprising:

displaying first media content and first prompt information on a media content display page, wherein the first prompt information is configured to prompt to add the first media content to a favorites folder;

displaying a favorites folder panel of a current user in response to a second trigger operation on the first prompt information, wherein the favorites folder panel is used to perform a first trigger operation;

receiving the first trigger operation, wherein the first trigger operation is associated with at least one piece of media content that is media content on which the current user has performed a first interactive operation;

adding the at least one piece of media content to a media content collection in response to the first trigger operation, wherein the media content collection is a collection of at least part of media content on which the current user has performed a second interactive operation comprising a favorite operation; and wherein adding the at least one piece of media content to the media content collection further comprises:

adding the first media content displayed on the media content display page to the favorites folder corresponding to the first trigger operation, wherein the favorites folder is displayed on a favorites page of the current user, and the media content display page is used to display media content added to the favorites page.

2. The method according to claim 1, wherein a favorite control is further displayed on the media content display page, and the method further comprises:

adding the first media content to the favorites page of the current user in response to the second interactive operation for the favorite control, wherein the first media content is not added to the favorites folder.

3. The method according to claim 1, wherein the adding the at least one piece of media content to the media content collection comprises:

adding second media content selected by the current user to the media content collection, wherein the second media content is media content on which the current user has performed the first interactive operation.

4. The method according to claim 3, wherein the second interactive operation comprises a favorite operation, and the adding second media content selected by the current user to the media content collection comprises:

adding the second media content selected by the current user to the favorites page of the current user, wherein the second media content is not added to the favorites folder; or adding the second media content selected by the current user to the favorites folder corresponding to the first trigger operation, wherein the favorites folder is displayed on the favorites page of the current user.

5. The method according to claim 4, wherein the adding the second media content selected by the current user to the favorites folder corresponding to the first trigger operation comprises:

adding the second media content selected by the current user to the favorites folder corresponding to the first trigger operation, and displaying the favorites folder corresponding to the first trigger operation.

6. The method according to claim 3, wherein before receiving the first trigger operation, the method further comprises:

displaying a selection interface, and displaying, in the selection interface, first media content information of at least part of media content on which the current user has performed the first interactive operation, wherein the first media content information is used to trigger or cancel selection of the respective media content.

7. The method according to claim 6, wherein the second interactive operation comprises a favorite operation, and a selection complete control is further displayed in the selection interface, wherein the selection complete control is used to perform the first trigger operation or trigger display of a predetermined panel, wherein the predetermined panel comprises at least one of the favorites folder panel of the current user and a favorites folder creation panel, and the predetermined panel is used to perform the first trigger operation.

8. The method according to claim 6, wherein after displaying the selection interface, the method further comprises at least one of:

canceling, in response to a third trigger operation acting in the selection interface, the first interactive operation performed by the current user on the selected second media content; or canceling, in response to a fourth trigger operation in the media content collection, the first interactive operation performed by the current user on third media content, wherein the third media content is invalid media content.

9. The method according to claim 6, wherein before displaying the selection interface, the method further comprises:

displaying a predetermined page element and second media content information of the at least part of media content on which the current user has performed the first interactive operation, wherein the predetermined page element comprises at least one of second prompt information and a predetermined control, wherein the second prompt information is used to prompt to add the at least part of media content on which the current user has performed the first interactive operation to the media content collection, and the predetermined page element is used to trigger display of the selection interface.

10. An electronic device, comprising:

at least one processor; and a memory communicatively connected to the at least one processor, wherein the memory stores a computer program executable by the at least one processor, and the computer program, when executed by the at least one processor, causes the at least one processor to:

display first media content and first prompt information on a media content display page, wherein the first prompt information is configured to prompt to add the first media content to a favorites folder;

display a favorites folder panel of a current user in response to a second trigger operation on the first prompt information, wherein the favorites folder panel is used to perform a first trigger operation;

receive the first trigger operation, wherein the first trigger operation is associated with at least one piece of media content that is media content on which the current user has performed a first interactive operation;

add the at least one piece of media content to a media content collection in response to the first trigger operation, wherein the media content collection is a collection of at least part of media content on which the current user has performed a second interactive operation comprising a favorite operation; and wherein adding the at least one piece of media content to the media content collection further comprises:

adding the first media content displayed on the media content display page to the favorites folder corresponding to the first trigger operation, wherein the favorites folder is displayed on a favorites page of the current user, and the media content display page is used to display media content added to the favorites page.

11. The device according to claim 10, wherein a favorite control is further displayed on the media content display page, and the device is further caused to:

add the first media content to the favorites page of the current user in response to the second interactive operation for the favorite control, wherein the first media content is not added to the favorites folder.

12. The device according to claim 10, wherein the computer program causing the processor to add the at least one piece of media content to the media content collection further causes the processor to:

add second media content selected by the current user to the media content collection, wherein the second media content is media content on which the current user has performed the first interactive operation.

13. The device according to claim 12, wherein the second interactive operation comprises a favorite operation, and the computer program causing the processor to add the second media content selected by the current user to the media content collection further causes the processor to:

add the second media content selected by the current user to the favorites page of the current user, wherein the second media content is not added to the favorites folder; or add the second media content selected by the current user to the favorites folder corresponding to the first trigger operation, wherein the favorites folder is displayed on the favorites page of the current user.

14. The device according to claim 13, wherein the computer program causing the processor to add the second media content selected by the current user to the favorites folder corresponding to the first trigger operation further causes the processor to:

add the second media content selected by the current user to the favorites folder corresponding to the first trigger operation, and display the favorites folder corresponding to the first trigger operation.

15. The device according to claim 12, wherein before receiving of the first trigger operation, the device is further caused to:

display a selection interface, and display, in the selection interface, first media content information of at least part of media content on which the current user has performed the first interactive operation, wherein the first media content information is used to trigger or cancel selection of the respective media content.

16. A non-transitory computer-readable storage medium, storing computer instructions that, when executed by a processor, cause the processor to:

display first media content and first prompt information on a media content display page, wherein the first prompt information is configured to prompt to add the first media content to a favorites folder;

display a favorites folder panel of a current user in response to a second trigger operation on the first prompt information, wherein the favorites folder panel is used to perform a first trigger operation;

receive the first trigger operation, wherein the first trigger operation is associated with at least one piece of media content that is media content on which the current user has performed a first interactive operation; and add the at least one piece of media content to a media content collection in response to the first trigger operation, wherein the media content collection is a collection of at least part of media content on which the current user has performed a second interactive operation comprising a favorite operation; and wherein adding the at least one piece of media content to the media content collection further comprises:

adding the first media content displayed on the media content display page to the favorites folder corresponding to the first trigger operation, wherein the favorites folder is displayed on a favorites page of the current user, and the media content display page is used to display media content added to the favorites page.

* * * * *